April 1, 1941. P. D. MERRILL 2,236,913
WELDING PATCH CLAMP
Filed Nov. 17, 1937 4 Sheets-Sheet 1
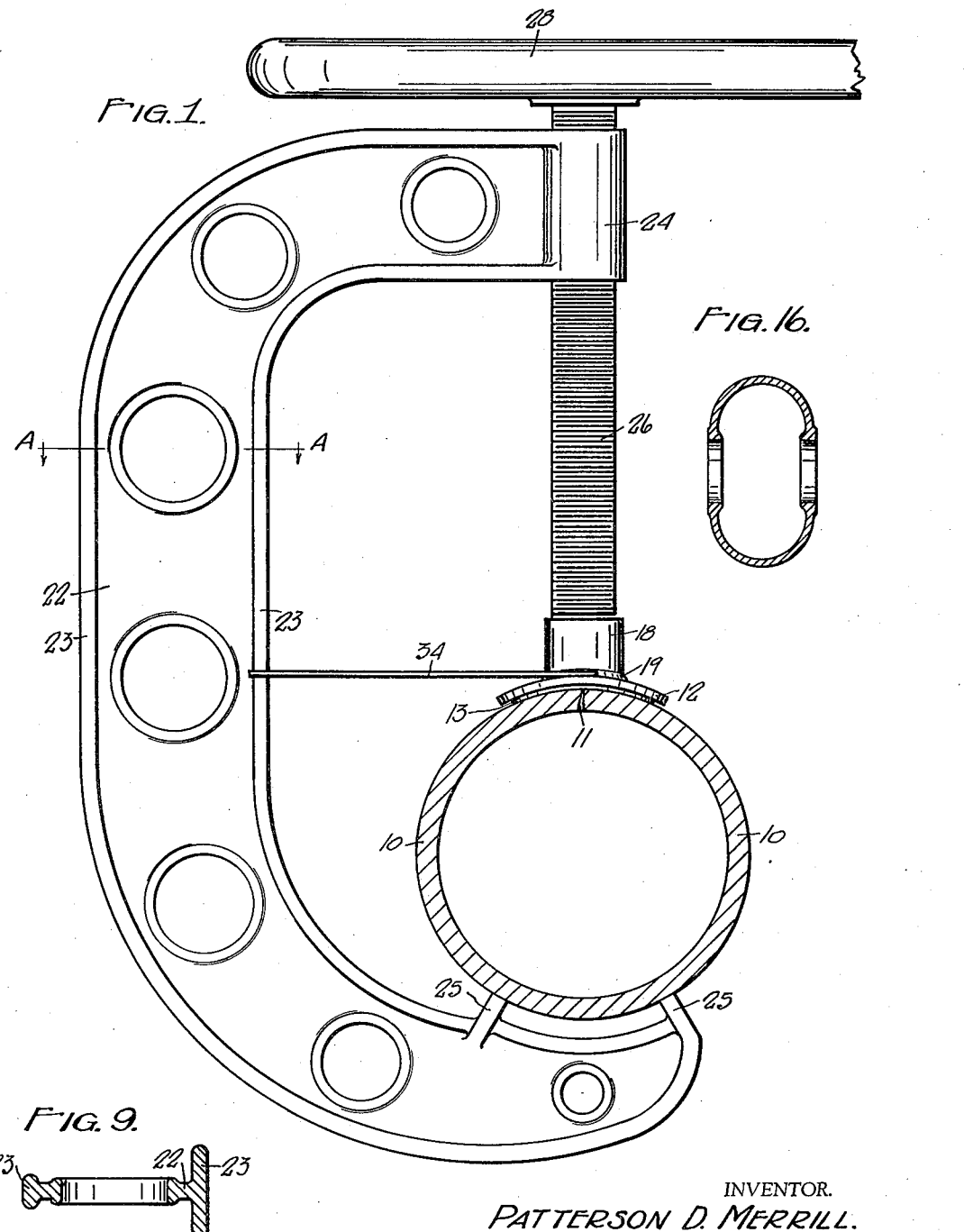
INVENTOR.
PATTERSON D. MERRILL.
BY Oltsch & Knoblock
ATTORNEYS.

April 1, 1941.  P. D. MERRILL  2,236,913
WELDING PATCH CLAMP
Filed Nov. 17, 1937    4 Sheets-Sheet 2
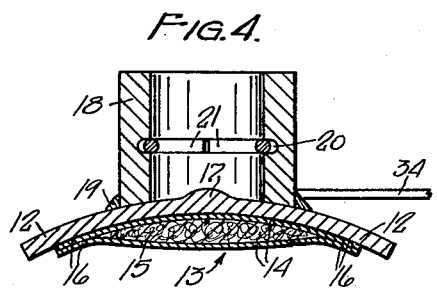
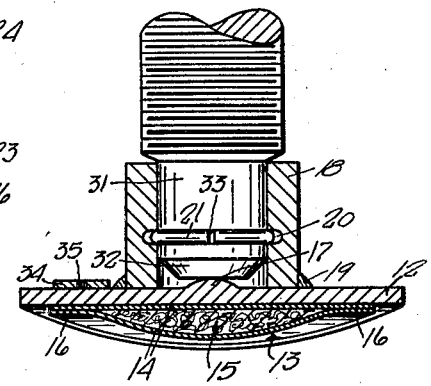
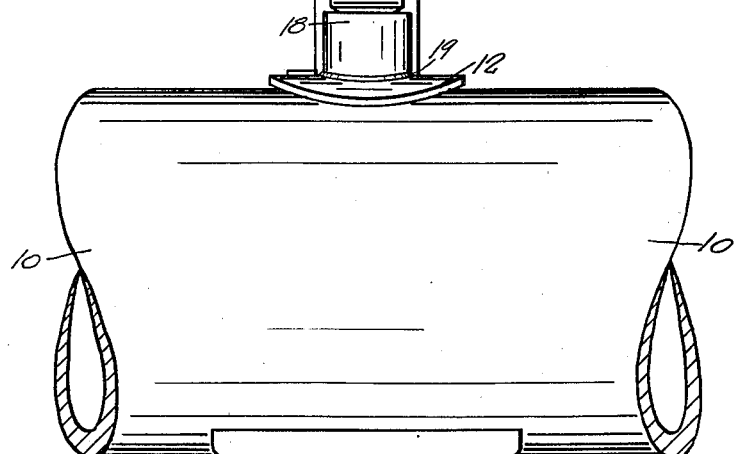
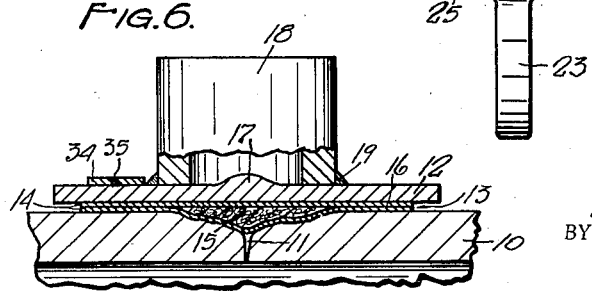
INVENTOR.
PATTERSON D. MERRILL.
BY Oltsch & Knoblock
ATTORNEYS.

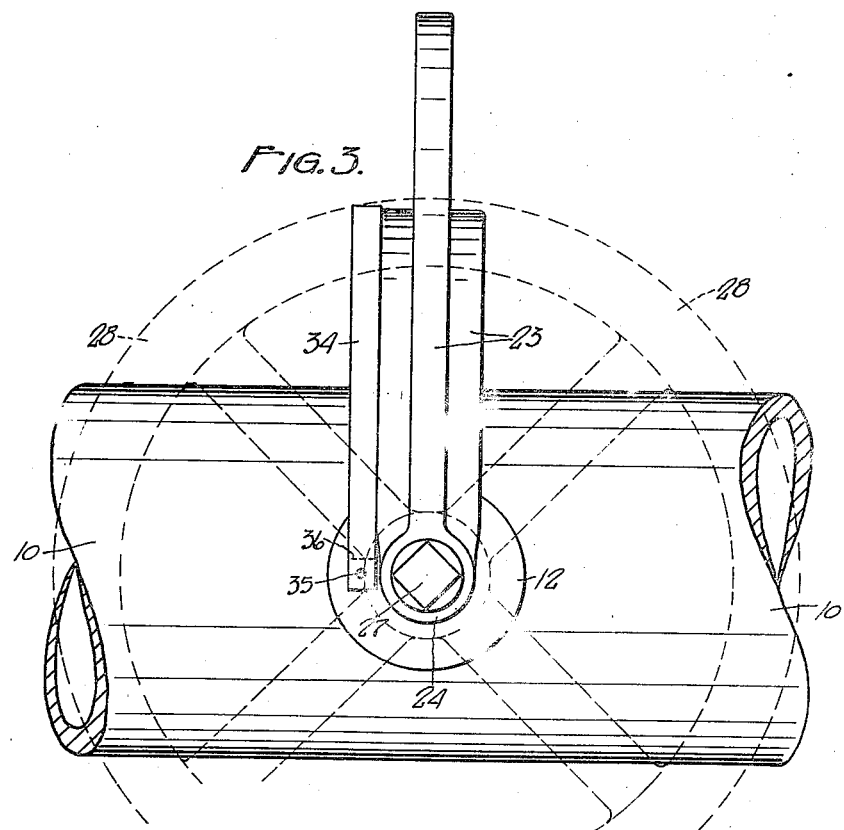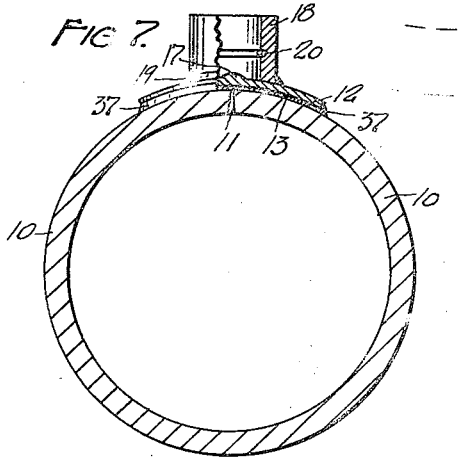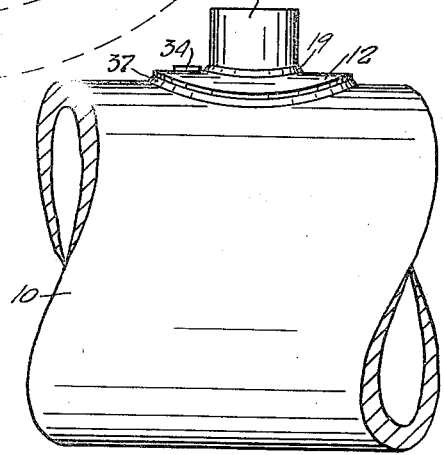

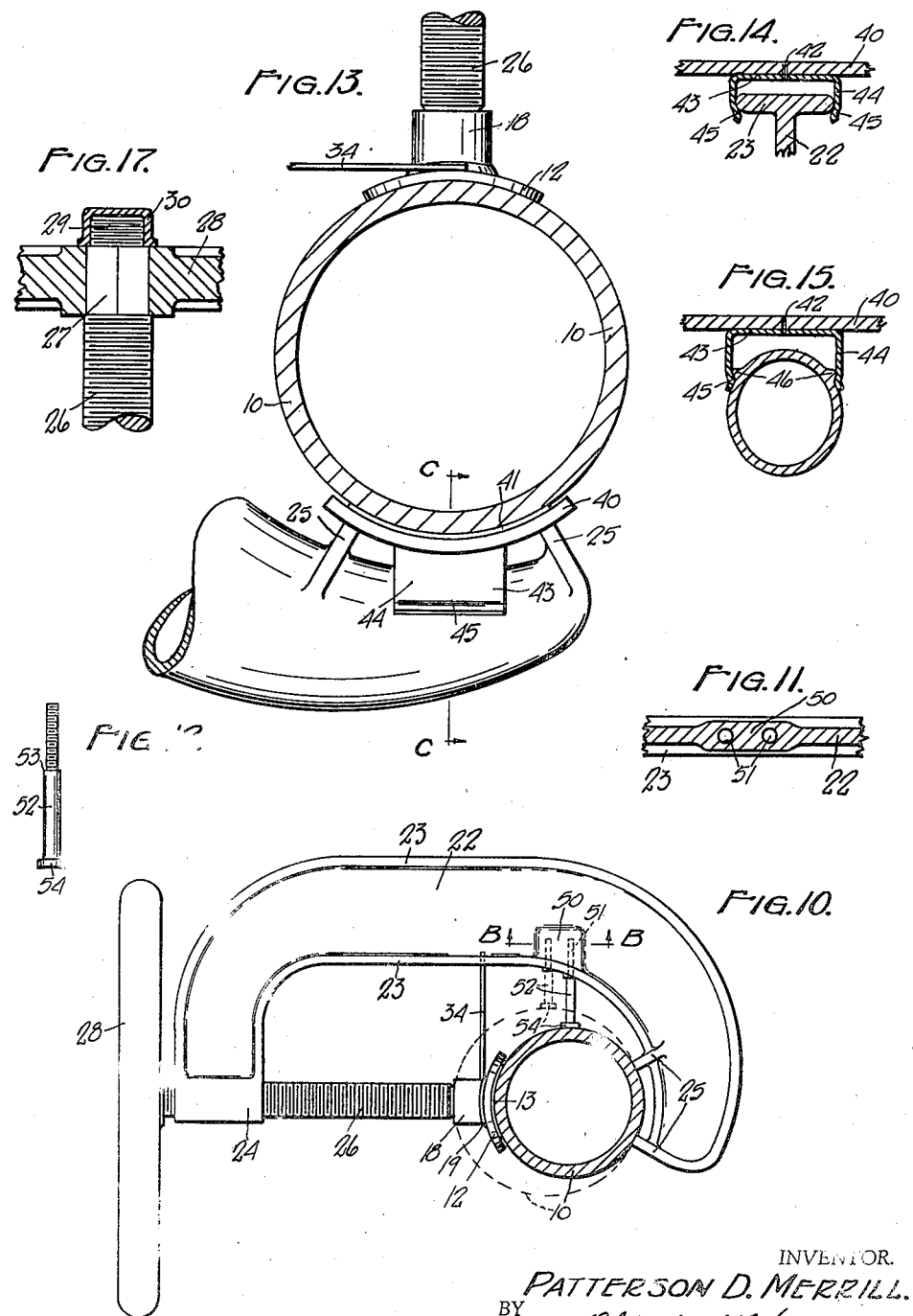

Patented Apr. 1, 1941

2,236,913

UNITED STATES PATENT OFFICE 2,236,913

WELDING PATCH CLAMP

Patterson D. Merrill, South Bend, Ind., assignor to M. B. Skinner Co., South Bend, Ind.

Application November 17, 1937, Serial No. 175,082

6 Claims. (Cl. 138—99)

This invention relates to a welding patch clamp, and more particularly to a clamp by means of which a patch may be applied to a leaking pipe preparatory to welding the same to the pipe.

In high pressure pipe lines, such as pipe lines for natural gas which is under extremely high pressure, for instance pressures ranging up to 1200 pounds per square inch, the sealing of a leak in the pipe presents serious difficulties. An effective way to seal such a leak is to apply to the leaking portion of the pipe a metal plate in the nature of a patch which can be welded to the pipe at the periphery of the patch. The patch thus becomes, in effect, an integral part of the pipe, and the leak is permanently sealed. In order to successfully weld a patch on a leaking pipe, however, certain conditions and problems must be met and overcome.

Chief among the conditions met is the disturbing effect of escaping fluid under extremely high pressure which resists application and holding of a patch plate in sealing position on the pipe. In other words, the escaping fluid exerts its force against the patch as the latter is brought near its intended seat and "blows" it away, at least to the extent of preventing accurate application to or positioning on the pipe. It is obvious that the provision of means for holding the patch in place is comparatively simple, but the difficulty arises in the accurate initial application of the patch against the action of escaping fluid since it is generally impossible or impractical for economic or operating reasons to close the pipe line for the purpose of sealing a pipe leak.

Another consideration faced in repairing a pipe leak by welding a patch thereon is that the patch must seal the leak preparatory to and during the welding operation so that the welding heat will not cause ignition or explosion of the gas either within the pipe or adjacent thereto. Also, the clamp for holding the welding patch to place must permit freedom of access to the entire periphery of the patch for welding.

It is, therefore, the primary object of this invention to provide a device of this character which meets the above defined conditions and problems.

A further object is to provide a quick acting clamp to which a patch plate may be effectively locked preparatory to and during application of the plate to the pipe and tightening of the clamp.

A further object is to provide a novel welding patch having a sealing gasket of substantially non-inflammable material.

A further object is to provide a simple and comparatively inexpensive device of this character which can be operated by one man without assistance.

A further object is to provide a device of this character by which a welding patch can be applied to and held on a leaking pipe in sealing relation in an emergency where the patch cannot be immediately welded to the pipe.

A further object is to provide a clamp having novel means for detachably locking a welding plate thereto.

A further object is to provide a clamp having a screw threaded pressure applying member carrying a sealing plate with means for preventing rotation of said plate during clamp operation.

A further object is to provide a device of this character comprising a clamp having a rotatable pressure applying member and a seal pressed against a pipe by said member, wherein said seal is provided with a rounded projection against which said member presses whereby binding friction between said member and seal is avoided.

A further object is to provide a device of this character with a novel gasket.

A further object is to provide a leak sealing gasket adapted to conform to an irregular contour and comprising a flexible casing and a filler of fibrous material.

A further object is to provide a device of this character with means for seating the same in operative relation to a pipe.

A further object is to provide a novel clamp construction for the purpose of avoiding clamp distortion.

Other objects will be apparent from the description and the appended claims.

In the drawings:

Fig. 1 is a cross-sectional view of a leaking pipe having my device applied thereto in sealing relation preparatory to welding.

Fig. 2 is a side elevation of a pipe having my device applied thereto in sealing relation.

Fig. 3 is a top plan view of my device applied to a pipe, with parts thereof shown in dotted lines.

Fig. 4 is an enlarged transverse sectional view of the welding patch and gasket.

Fig. 5 is an enlarged transverse sectional view taken at right angles to Fig. 4 and illustrating the interlock between the clamp and the patch.

Fig. 6 is a fragmentary enlarged sectional view illustrating the manner in which the gasket seals a leak preparatory to welding of the patch plate.

Fig. 7 is a cross-sectional view of a pipe to which a patch has been welded, parts of said patch being shown in section.

Fig. 8 is a side view of a pipe having a patch welded thereto.

Fig. 9 is a sectional view of one form of clamp taken on line A—A of Fig. 1.

Fig. 10 is a view similar to Fig. 1 and illustrating the provision of positioning means on the clamp to facilitate use thereof in positions at an angle to the vertical.

Fig. 11 is a fragmentary sectional view of the clamp taken on line B—B of Fig. 10.

Fig. 12 is a side view of a positioning member used with the clamp.

Fig. 13 is a fragmentary view of the device similar to Fig. 1 and illustrating the mounting of a patch plate on the clamp to seal a leak located at the bottom or lower portion of a pipe.

Fig. 14 is a fragmentary sectional view taken on line C—C of Fig. 13, illustrating means for locking a patch to a clamp as illustrated in Fig. 1.

Fig. 15 is a fragmentary sectional view taken on line C—C of Fig. 13 and illustrating application of patch locking means to a modified clamp construction.

Fig. 16 is a sectional view taken on line A—A of Fig. 1 and illustrating a modified clamp frame construction.

Fig. 17 is a fragmentary sectional view taken on line D—D of Fig. 2.

Referring to the drawings, the numeral 10 designates a pipe having a leaking portion 11 to be sealed by a patch plate 12. Plate 12 may be of any desired or necessary size and peripheral shape, and is bent to conform to the curvature of pipe 10. On its concave inner face, and in inwardly spaced relation to its periphery, the plate 12 carries a gasket 13 which is preferably cemented thereto. Gasket 13 is preferably of substantially pillow-like construction, and is preferably formed of a pair of opposed sheets 14 of asbestos cloth or other flexible non-inflammable sheet material having fibrous material 15, such as loose asbestos fibers interposed between the sheets 14 at their center. The marginal portions 16 of sheets 14 are adhesively secured in face contacting engagement by a suitable adhesive, such as rubber cement, to confine the fibrous filler. Substantially centrally of plate 12 at its outer convex face is formed an integral rounded protuberance 17. One end of a cylindrical sleeve 18 centered relative to protuberance 17 is secured, as by welding at 19, to the plate in coaxial relation thereto. A narrow deep circumferential groove 20 is formed in the interior of sleeve 18 intermediate its ends and in outwardly spaced relation to protuberance 17. Within groove 20 is seated a split wire ring 21 preferably formed of comparatively soft metal and having its inner diameter less than the inner diameter of sleeve 18. Groove 20 is of a depth at least equal to the thickness of the wire of ring 21.

A clamp is employed to apply and hold the patch in operative relation to the leak. This clamp is preferably of C-shape and may comprise a frame of substantially I-section having an apertured web 22 and inner and outer flanges 23. At one end the clamp is provided with a head 24 having a threaded bore extending longitudinally of the clamp. At its opposite end the clamp is provided with a pair of spaced, integral, transversely extending flanges or plates 25 which are positioned in opposed equi-spaced relation to a projection of the axis of head 24. A screw threaded shaft 26 is carried by head 24, having its outer end configured at 27 to removably mount a hand wheel 28. In view of the high pressure operating conditions under which this device is used, the shaft 26 is also provided with a reduced screw threaded portion 29 at its outer end to receive a nut 30 which bears on the hand wheel 28 to removably lock the latter to the clamp, as illustrated in Fig. 17. At its opposite or inner end, the shaft 26 is provided with a reduced diameter end portion 31 adapted to fit within sleeve 18 for rotation relative thereto. The end of shaft portion 31 is tapered at 32, and a circumferential groove 33 is formed therein to receive split ring 21 when the end of said shaft bears on protuberance 17 of patch plate 12.

A thin strip of metal 34 is spot welded at 35 or otherwise secured to the outer face of patch plate 12 to one side of sleeve 18 and preferably projects from said plate in perpendicular relation to the sleeve 18. Strip 34 is of sufficient length to engage the body of the clamp, and is so positioned that it will hold said patch plate against rotation during the operation of shaft 26 with its axis of curvature parallel to the axis of pipe 10. The strip is also preferably crimped at 36 adjacent its connection with the patch plate.

Operation of the device is as follows:

A patch plate 12 of suitable size and shape to fit over the leaking area of a pipe is mounted on the end of shaft 26, and handwheel 28 or like suitable operating means of sufficient weight to have a fly-wheel effect is mounted on the clamp and preferably locked to place by nut 30. The assembly is then applied to the leaking pipe with the flanges 25 bearing against the pipe opposite the leak and the patch plate spaced from the pipe. The clamp can readily be held in this position with one hand. With the other hand the operator can spin the handwheel to force the patch plate and gasket against the leak in the pipe. The screw action of applying the plate to place affords sufficient leverage to overcome the tremendous pressure of fluid leaking from the pipe, where a gasket as described is employed. During the screw action the strip 34 bears against the clamp to hold the patch plate against rotation in a position to accurately seat on the pipe. In order to permit the operation of the device with minimum friction opposing application and seating of the patch plate, the protuberance 17 on which the end of shaft 26 bears, constitutes an antifriction bearing. Furthermore, the interfitting and locked relation of sleeve 18 of the patch plate and shaft 26, prevents the force of escaping fluid from deflecting the patch plate and from disconnecting it from the clamp as it moves toward the pipe; and the flanges 25 of the clamp are of sufficient length that they form a solid abutment on the pipe which prevents the escaping fluid from tilting or otherwise shifting the clamp while the clamp is operated to apply the patch plate.

The flexible "pillow" type gasket herein described is of great importance to the construction, this for the reason that it may seat solidly upon the leaking area of the pipe, as where the same is pitted as shown in Fig. 6, and thus seals the leak in situ. When the tremendous pressures under which this device is operated, such as 1200 pounds per square inch, are considered, it will be seen that the pitted area might be several square inches in extent, which would require the clamp to work against a total of 3000 or 4000 pounds pressure if a flat gasket was employed. With the gasket described the total pressure to be overcome is reduced since pressure applied to the gasket will compress the fibrous filler and cause the same to work into the pitted area until the margin of the gasket is brought firmly to bear on the pipe.

When the gasket and plate have been firmly brought to bear on the pipe to seal the leak, they may be held there indefinitely by the clamp, as in an emergency where welding apparatus is not available, or time does not permit the welding operation to be done. In such instances, the hand wheel may be removed to prevent tampering with the seal. The welding of the patch plate to the pipe at 37, Figs. 7 and 8, makes the seal permanent; and it will be seen that one of the advantages of this device is the fact that sufficient clearance is afforded between the clamp, pipe and patch plate to afford free access to the entire margin of the patch plate for welding purposes. The non-inflammable character of the gasket permits the welding operation to be carried on without injury to the gasket or breaking of the seal effected thereby. When the welding operation has been completed, the clamp may be loosened and removed from the pipe, the use of a soft wire split locking ring 21 facilitating such removal. The sleeve 18, of necessity, remains on the patch plate, but this is not objectionable since most pipes are so disposed that there is little danger of injury to the patch by objects striking against this projecting sleeve. The strip 34 may be broken off at crimp 36 when the seal has been effected.

The clamp frame is required to withstand great stress and torque while in use. In order to successfully withstand and overcome this stress and torque to greater effect than is possible with the I section clamp frame construction, the clamp frame may be cast in oval sectional shape with uniform and comparatively thin walls, as illustrated in Fig. 16. It will be seen that with this construction the strength of the clamp frame and its resistance to distortion is greatly increased. This oval type of clamp frame may be apertured to reduce the weight thereof as much as possible without sacrifice of strength by providing reinforcing lips about the apertures, and the apertures afford means for release of core sand after casting. The pipe engaging flanges 25 are cast integrally with the oval type of clamp frame as illustrated in Fig. 13, and an internally screw threaded head may likewise be cast intgerally therewith, as in the conventional frame of I section.

The leaking area of a pipe may be so located that it is difficult or impossible to handle the clamp to apply a patch carried by the threaded shaft of the clamp. For instance, a pipe may be located in a trench, and a leak occur at the under side of the pipe. In such a case the construction illustrated in Figs. 13 to 15 may be employed. In this construction the patch plate 40, having a gasket 41 of the "pillow" type hereinbefore described cemented thereto, is provided in a size sufficient to span and seat on flanges 25 of the clamp frame. At the center of the convex outer face of the clamp is secured, as by welding at 42, the base of a U-shaped resilient clip 43. The arms 44 of the clip are spaced apart a distance substantially equal to the width of the adjacent portion of the clamp frame, as the width of inner flange 23 of an I section clamp frame, and said arms are of a length to overlie the inner portion of said clamp frame, with inwardly bent off-sets 45 at the ends of the arms to engage and lock on said flange as illustrated in Fig. 14. Where the oval section frame is employed, outwardly projecting ribs 46 may be provided for spring pressed engagement by said off-sets 45 as illustrated in Fig. 15. A regular patch plate 12 mounted on the clamp shaft 26, preferably without a gasket, completes the assembly. It will be seen that with this construction the plate 12 seats on the pipe preparatory to sealing operation thereof, and the seating of plate 40 on flanges 25, locked to place by spring clip 43, serves to positively lock said plate to the clamp against displacement by the pressure of escaping fluid while the same is urged into operative sealing relation with the pipe by the clamp. Access to the patch for welding may be more difficult with this construction, largely because of the inconvenient location of the leak, but the clamp frame is so arranged and spaced with relation to the patch plate and pipe that it will not, by itself, increase difficulty of access for welding purposes to any great extent.

It will be obvious that leaks will often occur in a pipe at such points that the clamp must be held at angle to the vertical. In such cases it becomes difficult to hold the clamp in proper position with the flanges 25 thereof both solidly abutting the pipe. It, therefore, becomes desirable to insure proper centering of the clamp with relation to the pipe to provide an accurate three-point abutment between clamp and pipe during the period in which the clamp is operated to effect a seal preparatory to welding, as illustrated in Figs. 10 to 12. For this purpose I provide the clamp, as the web 22, with a thickened portion 50 in which a plurality of tapped bores 51 in predetermined spaced relation to each other and to flanges 25 may be formed. Each bore is preferably so formed that its axis will intersect the axis of a given size of pipe with which the clamp is usable. A pin 52 having a reduced screw-threaded end forming a shoulder 53, and an opposed head end 54, is adapted to be threaded in each bore 51, the length of each pin differing according to the bore 51 into which it is intended to fit, and the shoulder 53 serving as a stop to properly position each pin in its bore. Thus, in Fig. 10 there is illustrated in full lines the removable abutment pin carried by the clamp to abut the size of pipe shown in full lines, while a different size of pin in another bore for engagement with a larger size of pipe is illustrated in dotted lines. The three-point abutment thus provided enables the operator to hold the clamp accurately against the pipe with one hand for angular uses, thus leaving the other hand free for manipulation of hand wheel 28.

It will thus be seen that the instant device is simple and easy to handle by reason of the rigid character and assembly of the parts which permit holding thereof with one hand and operation with the other hand; that the patch plate and gasket are solidly held by the clamp during application thereof to the pipe and against the strong displacing stress or force exerted thereon by fluid escaping under high pressure from the pipe; that the clamp permits fly-wheel operation to effect a rapid seal, with friction reduced to a minimum and manual guiding of the patch plate per se to the pipe unnecessary; that the clamp does not interfere with welding of the plate to the pipe; and that the device can be accurately and conveniently used to seal leaks regardless of the circumferential position thereof on the pipe.

I claim:

1. The combination with a clamp adapted to extend partially around a pipe in spaced relation thereto, spaced offset transverse flanges carried by one end of said clamp to hold said pipe spaced from said clamp end, a shaft threaded in the other end of said clamp, of a patch plate adapted to seat on and be welded to said pipe, and means for detachably locking said plate on said shaft and for journaling said plate on said shaft.

2. The combination with a clamp adapted to extend partially around a pipe in spaced relation thereto, off-set pipe engaging members at one end of said clamp, a shaft threaded in the other end of said clamp, of a curved patch plate adapted to seat on said pipe, means for detachably locking said plate journaled on said shaft, and an elongated member on said patch plate engageable with said clamp to hold said plate against rotation upon operation of said shaft.

3. The combination with a clamp having a rotatable shaft, of a curved patch plate adapted to be pressed against a pipe by said clamp, a sleeve welded centrally to the convex face of said plate and rotatable on the end of said shaft, said sleeve and shaft having complementary circumferential grooves, a split ring seated in said grooves, one of said grooves being of a depth at least equal to the thickness of said ring to accommodate interlocking and release of said shaft and sleeve by relative axial movement thereof.

4. The combination with a clamp adapted to extend partially around a pipe in spaced relation thereto and having fixed and movable clamping parts in opposed relation, of a patch plate carried by one of said clamping parts and supported thereby in operative relation to the clamp, and resilient means for detachably locking said plate to said clamp, said locking means being positioned outwardly of said plate whereby said plate is locked against displacement by fluid escaping from a pipe leak under high pressure during operation of said clamp.

5. The combination with a clamp adapted to extend partially around a pipe in spaced relation thereto and having a pair of spaced off-set transverse flanges and an opposed shiftable member, of a patch plate bearing on said flanges, and a resilient member carried by said plate and gripping said clamp to lock said plate in operative relation on said flanges.

6. The combination with a C-shaped clamp adapted to extend partially around a pipe in spaced relation thereto, spaced off-set pipe engaging flanges integrally formed with one end of said clamp and extending transversely thereof, a shaft threaded in the other end of said clamp, said flanges and shaft constituting clamping elements, a sealing member detachably carried by one of said clamping elements for engagement with the pipe, and a member removably carried by said clamp substantially radially of the pipe in spaced relation to said flanges and cooperating with one of said clamp elements to operatively position said clamp during operation of said shaft.

PATTERSON D. MERRILL.